(12) United States Patent
Dravasa Gurruchaga et al.

(10) Patent No.: US 12,636,748 B2
(45) Date of Patent: May 26, 2026

(54) MACHINE TOOL WITH IMPROVED THERMAL STABILITY AND METHOD FOR IMPROVING THERMAL STABILITY IN A MACHINE TOOL

(71) Applicant: FUNDACIÓN TECNALIA RESEARCH & INNOVATION, Derio—Bizkaia (ES)

(72) Inventors: Juan José Dravasa Gurruchaga, Derio—Bizkaia (ES); Haritz Vallejo Artola, Derio—Bizkaia (ES)

(73) Assignee: FUNDACIÓN TECNALIA RESEARCH & INNOVATION, Derio—Bizkaia (ES)

( * ) Notice: Subject to any disclaimer, the term of this patent is extended or adjusted under 35 U.S.C. 154(b) by 0 days.

(21) Appl. No.: 18/726,029

(22) PCT Filed: Dec. 21, 2022

(86) PCT No.: PCT/EP2022/087263
§ 371 (c)(1),
(2) Date: Jul. 1, 2024

(87) PCT Pub. No.: WO2023/126277
PCT Pub. Date: Jul. 6, 2023

(65) Prior Publication Data
US 2025/0091171 A1 Mar. 20, 2025

(30) Foreign Application Priority Data
Dec. 29, 2021 (EP) ..................................... 21383232

(51) Int. Cl.
B23Q 11/14 (2006.01)
(52) U.S. Cl.
CPC .................................. B23Q 11/141 (2013.01)

(58) Field of Classification Search
CPC ...... B23Q 1/012; B23Q 11/10; B23Q 11/148; B23Q 11/141
See application file for complete search history.

(56) References Cited

U.S. PATENT DOCUMENTS 5,027,527 A * 7/1991 Dorris ................ G05D 23/1919
33/DIG. 19
2015/0231751 A1* 8/2015 Tullman ............... B23Q 11/128
165/137

FOREIGN PATENT DOCUMENTS

CN 208276515 U 12/2018
EP 1364741 A1 11/2003
(Continued)

OTHER PUBLICATIONS

Milligan, Gordan; "Earth Tubes . . . "; Dec. 1, 2013; Website—https://milligansganderhillfarm.wordpress.com/2013/12/01/earth-tubes-how-to-build-a-low-cost-systemto-passivly-heat-and-cool-your-home/ (Year: 2013).*
(Continued)

*Primary Examiner* — Daniel Jeremy Leeds
(74) *Attorney, Agent, or Firm* — CANTOR COLBURN LLP

(57) ABSTRACT

A machine tool with improved thermal stability includes a workpiece support for supporting at least one workpiece for allowing machining of the workpiece, and a support structure including a tool carrier support. The tool carrier support supports a tool carrier configured for carrying and driving a tool for machining a workpiece supported by the workpiece support through a relative movement between the workpiece and the tool. The machine has a conduit configured to allow the flow of air in a closed circuit, the conduit has a surface part and an underground part, the surface part being an inner
(Continued)

cavity of the support structure and the underground part having a piping configured to be buried in the soil beneath the support structure.

11 Claims, 10 Drawing Sheets

(56) References Cited

FOREIGN PATENT DOCUMENTS

| | | | |
|---|---|---|---|
| EP | 2907619 | A1 | 8/2015 |
| EP | 3222385 | B1 | 9/2018 |
| JP | S62251035 | A | 10/1987 |

OTHER PUBLICATIONS https://milligansganderhillfarm.wordpress.com/2013/12/01/earth-tubes-how-to-build-a-low-cost-systemto-passivly-heat-and-cool-your-home/ (Year: 2013).*
European Search Report for Application No. 21383232.2, dated May 23, 2022, 5 pages.
International Search Report for Application No. PCT/EP2022/087263, dated Mar. 23, 2023, 3 pages.
Written Opinion for Application No. PCT/EP2022/087263, dated Mar. 23, 2023, 5 pages.

* cited by examiner

MACHINE TOOL WITH IMPROVED THERMAL STABILITY AND METHOD FOR IMPROVING THERMAL STABILITY IN A MACHINE TOOL

CROSS-REFERENCE TO RELATED APPLICATIONS

This application is a 35 U.S.C. § 371 National Stage patent application of PCT/EP2022/087263, filed on 21 Dec. 2022, which claims the benefit of European patent application 21383232.2, filed on 29 Dec. 2021, the disclosures of which are incorporated herein by reference in their entirety.

TECHNICAL FIELD

This disclosure relates to machine tools which machine a workpiece by relatively moving a tool and the workpiece, such as horizontal machining centers, vertical machining centers, milling machines, grinding machines or vertical lathes and more particularly to machine tools with systems to prevent dimensional deformations due to ambient temperature fluctuations.

BACKGROUND

One of the main factors limiting accuracy in large machines tools are thermal deformations produced by the internally generated heat and the changing environmental conditions.

The thermal errors caused by thermal deformations can be of an order of magnitude equivalent to the geometrical errors of the machine, severely affecting the accuracy of the machine.

Over the years, the different sources of error have been studied and it is estimated that approximately 70% of the total error of a machine tool is made up of geometric and thermal sources.

In the 1960s, thermal errors were formally recognised as the major source of error on manufactured parts. The three main mechanisms that produce a structural temperature change are:

Heat generated internally by the machine.

Environmental temperature change.

External radiation sources.

Thermal effects within a machining environment have a great influence on the structure of a machine tool and therefore affect the accuracy of the machined part. Any kind of expansion and contraction will create distortion in the machine tool and affect its positioning accuracy. Over the years, researchers have shown that this thermal distortion of the machine tool can generate 40-70% of all dimensional errors in precision machined parts. Therefore, any small change in temperature can make a significant difference to the machined quality of a component.

The main reasons why machines are sensitive to these thermal effects are, on the one hand, the lack of symmetry of machine structure and, on the other hand, the uneven distribution of masses. That means that the dimensional evolution of the machine's structural assembly upon temperature changes is not uniform.

This unequal lengthening or shortening of the different parts of the structural bodies of the machine, as well as the different speeds of these variations due to the unequal distribution of masses, leads to twisting and bending of the parts.

FIG. 8 shows a schematic representation at an increased temperature of the cross-rail and two columns of a vertical lathe. The expansion of the metal can be seen to cause the cross-rail in particular to arch in the XZ and XY planes.

FIG. 9 shows the quantitative results of a simulation of the displacement of the tip of a tool mounted to a milling head of a vertical lathe in the X, Y and Z directions when exposed to a temperature change of 10° C. over a period of 24 hours.

FIG. 10 graphically shows the results of the same simulation. The colour map shows the distribution of the deformation across the structure of the vertical lathe such that it can be observed that the largest deformation occurs at the top of the lathe, especially in the cross-rail.

To overcome these drawbacks different solutions have been disclosed.

EP3222385 B1 teaches a method for compensating for the misalignment between the centre of the tool and the axis of the turning table which comprises moving the milling head along guides in the milling head support, wherein the guides move the milling head simultaneously in the z and y-directions and have an angle of 0.5-1.5° with respect to the ZX plane. Such a solution is limited in the range of displacement it can compensate for and is dependent on the milling head being moveable in the z-direction.

CN208276515U teaches a method for compensating for thermal error in a mineral goods lathe bed which comprises the use of cooling pipes embedded in the lathe bed and changing the internal material of the lathe-bed to one of low thermal conductivity and low thermal shrinkage. However, as this document explains in paragraph [0029], it is directed towards compensating for local temperature rises as a result of the operation of the machine. Furthermore, the cooling is not localised to a critical area which causes misalignment of the machine.

EP1 364 741 A1 discloses a machine tool comprising a bed defining a base and a column mounted in the rearward portion of the bed. A spindle head is mounted on the front face of the column. The column comprises an interior space which allows a liquid to be circulated to maintain the temperature of the column regardless any change in the room temperature.

SUMMARY

A first aspect of the disclosure relates to a machine tool comprising a workpiece support for supporting at least one workpiece for allowing machining of the workpiece a support structure (for example one or two vertical columns) comprising a tool carrier support (for example an spindle head), wherein the tool carrier support supports a tool carrier (for example an spindle) configured for carrying and driving a tool for machining a workpiece supported by the workpiece support through a relative movement between the workpiece and the tool.

According to the disclosure the machine comprises a conduit configured to allow the flow of air in a closed circuit, the conduit comprising a surface part and an underground part, the surface part being an inner cavity of the support structure and the underground part comprising a piping configured to be buried in the soil beneath the structure.

The air can be recirculated in the closed circuit by means of a fan or any other suitable driving means.

The inner cavity of the surface part can comprise sealing means to prevent the escape of the air inside de conduct. The inner cavity can also comprise ducts or pipes. The piping of the underground part can also be sealed.

By means of convection, the air brings the two parts of the conduit into thermal contact, the surface part which is influenced by the environment temperature and the underground part buried in the soil at a much more stable temperature and thus reducing the temperature gradient of the surface part which is influenced by the low temperature gradient of the subsoil through which the air flows in the underground part.

The structural bodies of the machines are traditionally made of cast iron or welded steel. In both cases they are usually structures consisting mainly of an outer surface as a shell and a "hollow" interior where stiffeners or ribs are included to improve the structural capabilities of the part while incorporating as little weight as possible.

According to the disclosure the surface part of the conduit is the cavity of the support structure (hollow interior of the structural bodies forming the support structure) such that the temperature stabilizing effect of the air directly affects the structure of the machine (the metallic outer shell of the structural bodies forming the support structure) and thus a decrease in the thermal variation of the machine is obtained which leads to greater dimensional stability in the machine tool structure and therefore improves the precision of the workpiece during machining.

In some embodiments the underground part comprises a serpentine tube.

In some embodiments the underground part comprises a duct embedded in the foundation of the machine.

In some embodiments the underground part is buried more than 1 m, and preferably between 5-10 m.

In some embodiments the length of the underground part is more than 10 m and preferably more than 20 m.

In some embodiments the support structure comprises two vertical columns joined by a transversal crossbeam such that at least one transversal carriage is displaceable along the transversal crossbeam in a horizontal direction X, whilst the tool carrier support is mounted in the transversal carriage and displaceable in a vertical direction Z. In these embodiments the surface part of the conduit is formed by an inner cavity in the vertical columns and an inner cavity in the transversal superior crossbeam.

A second aspect of the disclosure relates to a method for improving thermal stability in a machine tool comprising a workpiece support for supporting at least one workpiece for allowing machining of the workpiece a support structure (for example one or two vertical columns) comprising a tool carrier support (for example a spindle head), wherein the tool carrier support supports a tool carrier (for example a spindle), the tool carrier being configured for carrying and driving a tool for machining a workpiece supported by the workpiece support through a relative movement between the workpiece and the tool.

The method according to disclosure comprises the steps of:

providing an inner cavity in the support structure, burying a piping in the soil beneath the structure, forming a closed conduit having a surface part and an underground part and wherein the surface part comprises the inner cavity of the support structure and the underground part comprises the piping buried in the soil beneath the structure, providing driving means for moving air in a closed circuit inside the conduit.

In some embodiments the support structure (1) comprises two vertical columns (11) joined by a transversal crossbeam (12) such that the tool carrier support (2) is mounted on a carriage (14) displaceable along the transversal crossbeam (12) in a horizontal direction X, whilst the tool carrier (21) is mounted in the tool carrier support (2) and displaceable in a vertical direction Z. In these embodiments the closed conduit is formed with a surface part comprising an inner cavity (311) in the vertical columns (11) and an inner cavity (312) in the transversal superior crossbeam (12) and the underground part comprises the piping (32) buried in the soil (4) beneath the structure.

The machine tool can be a horizontal machining center, a vertical machining center, a milling machine, a grinding machine or a vertical lathe.

BRIEF DESCRIPTION OF THE DRAWINGS

To complete the description and in order to provide a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION OF A WAY OF THE DRAWINGS

Figure 1:
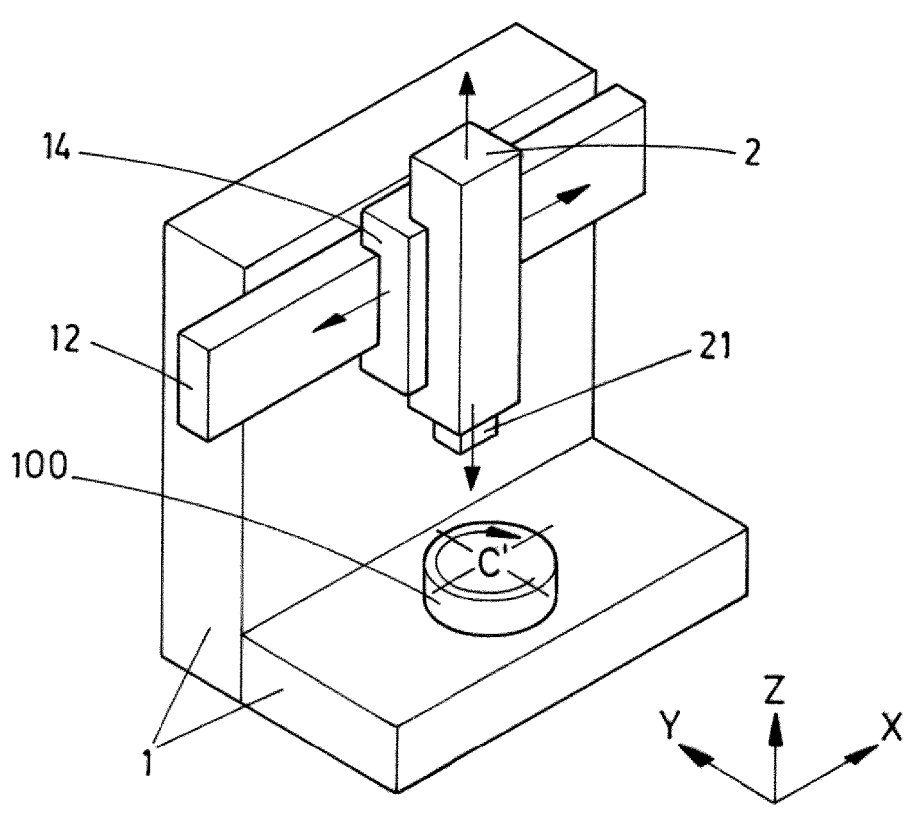
FIG. 1 shows a perspective view of a vertical lathe with a single milling head known in the prior art.
Figure 2:
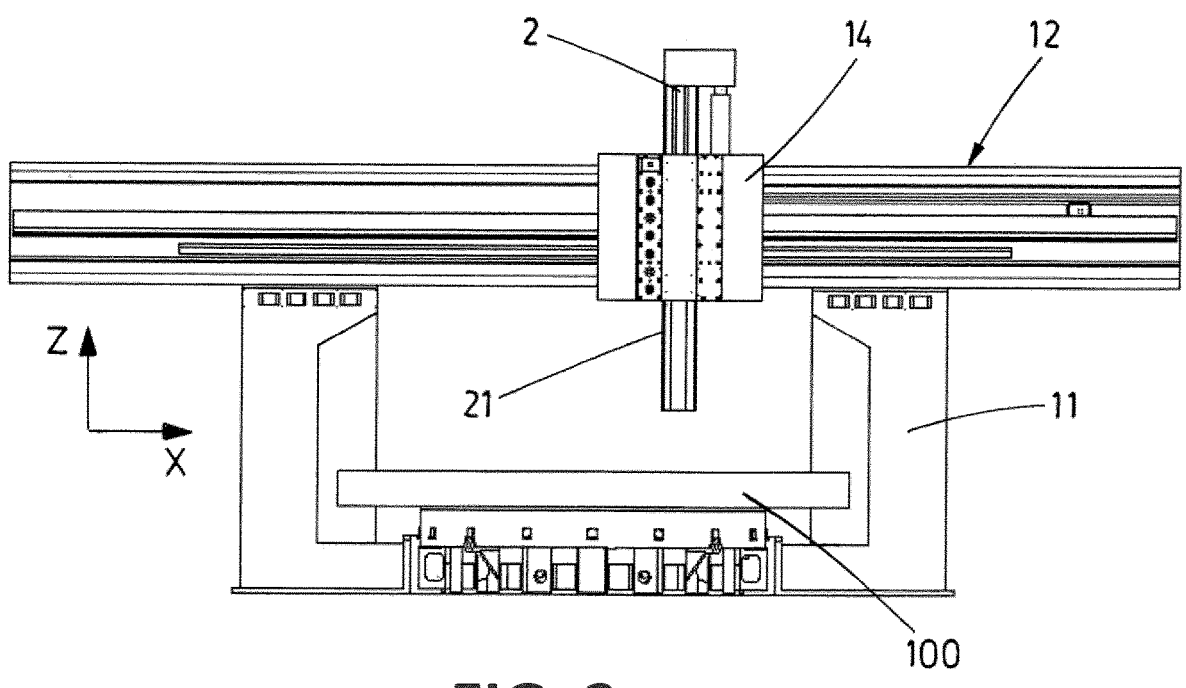
FIG. 2 shows a front view of a vertical lathe with two vertical columns a transversal crossbeam as known in the prior art.

FIGS. 1 and 2 illustrates two vertical lathes as known in the state of art, comprising a workpiece support 100 for supporting at least one workpiece for allowing machining of the workpiece and a support structure 1. A tool carrier support 2 is mounted on a carriage 14 displaceable along the transversal crossbeam 12 in a horizontal direction X. The tool carrier support 2 supports a tool carrier 21 movable in a vertical direction Z and configured for carrying and driving a tool for machining a workpiece supported by the workpiece support 100.

In the machine shown in FIG. 2 the structure comprises two vertical columns 11 and the cross beam 12.

Figures 3A, 3B:
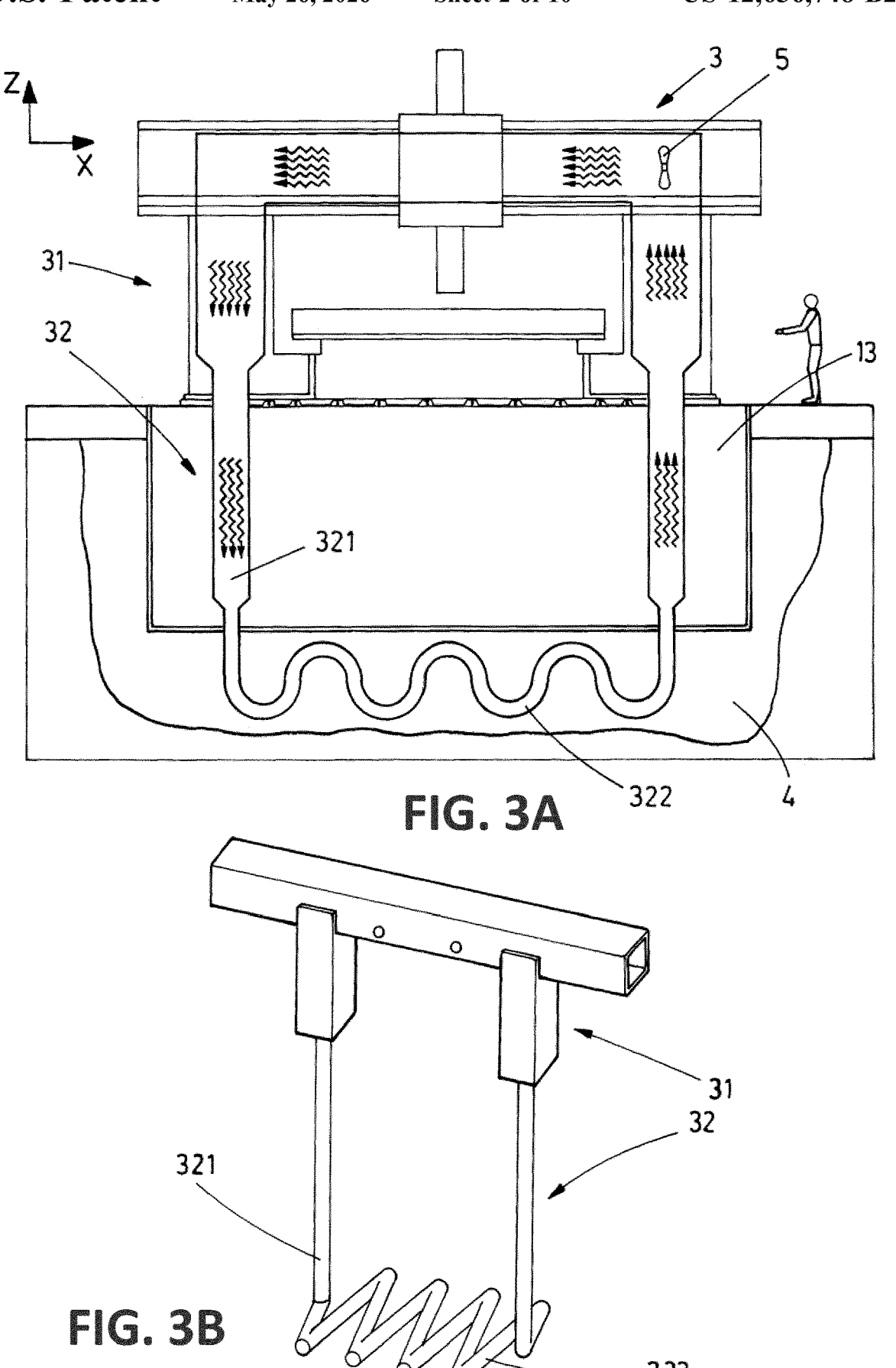
FIG. 3A shows a schematic cross section of an embodiment according to the disclosure.
FIG. 3B shows a schematic perspective view of an embodiment according to the disclosure.

FIG. 3A shows a cross section of a vertical lathe according to FIG. 2 and a conduit 3 configured to allow the flow of air in a closed circuit. The conduit 3 comprises a surface part and an underground part, the surface part being an inner cavity 31 of the support structure 1 and the underground part comprising comprises a piping 32. The piping 32 comprises a duct 321 embedded in the foundation 13 of the machine and a serpentine tube 322 buried in the soil 4 beneath the support structure 1. FIG. 3B shows a perspective view of the conduit 3 according to the disclosure.

The machine comprises a fan 5 to recirculate the air in the conduit 3.

Figure 4A:
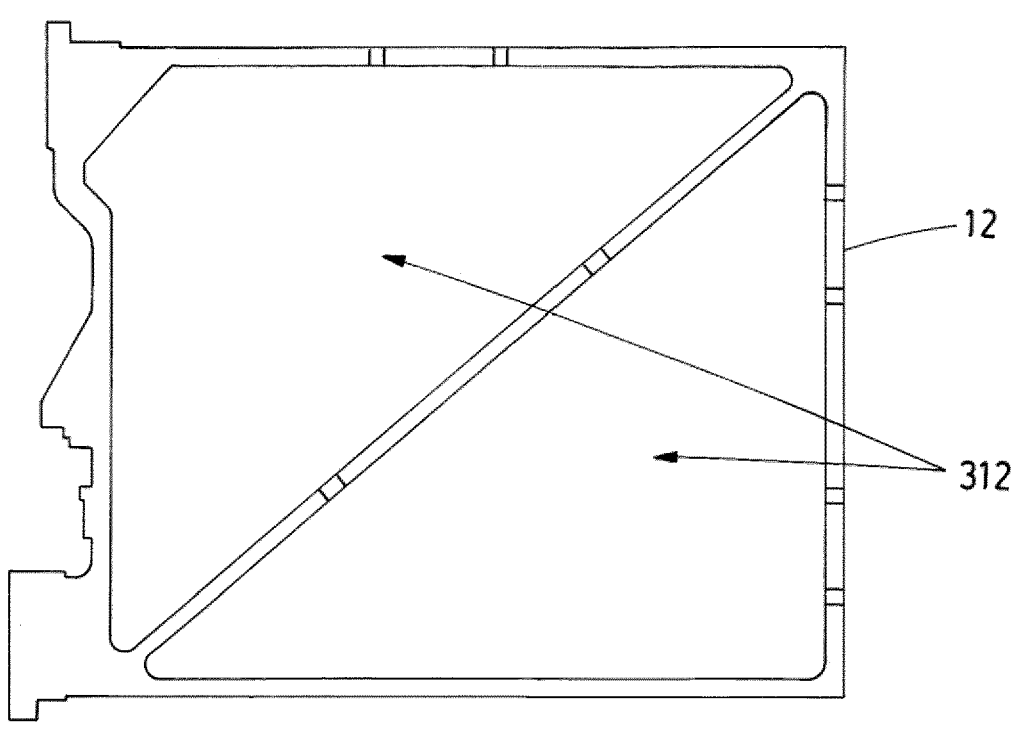
FIG. 4A shows a cross section of a transversal cross beam in a vertical lathe as per FIGS. 2 and 3.
Figure 6:
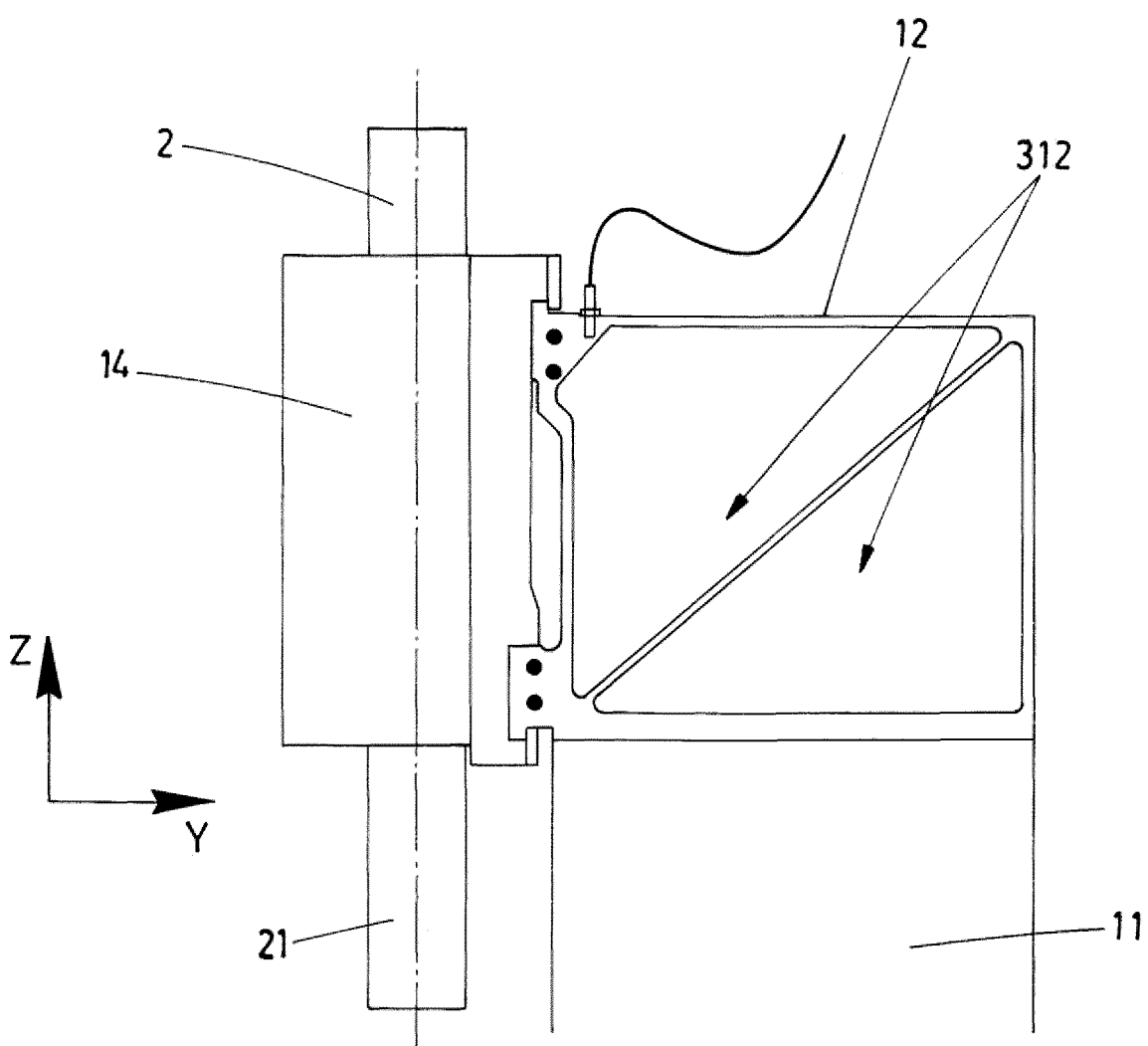
FIG. 6 shows a side view of a cross-section of a vertical lathe according to an embodiment of the disclosure showing the inner cavity of a cross beam wherein the air can circulate.

FIG. 4A illustrates a cross section of the transversal cross beam 12 showing the inner cavity 312 which forms part of the conduit 3, where the air flows. In FIG. 6 the cross beam 12 has been represented in its position over the vertical column 11. The figure also shows the carriage 14, tool carrier support 2 and the tool carrier 21.

Figure 4B:
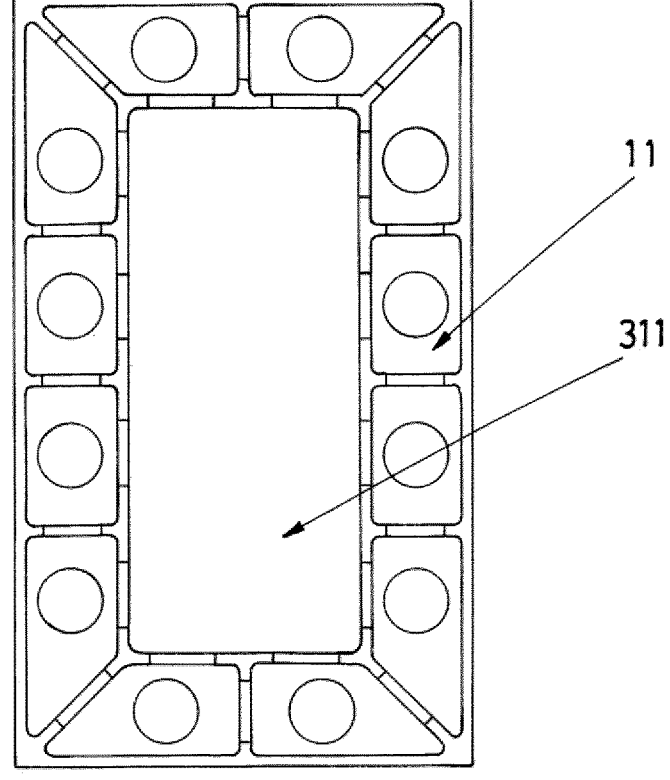
FIG. 4B shows a cross section of a vertical column in a vertical lathe as per FIGS. 2 and 3.

FIG. 4B illustrates a cross section of a vertical column 11 showing the inner cavity 311 which forms part of the conduit 3, where the air flows.

Figure 5A:
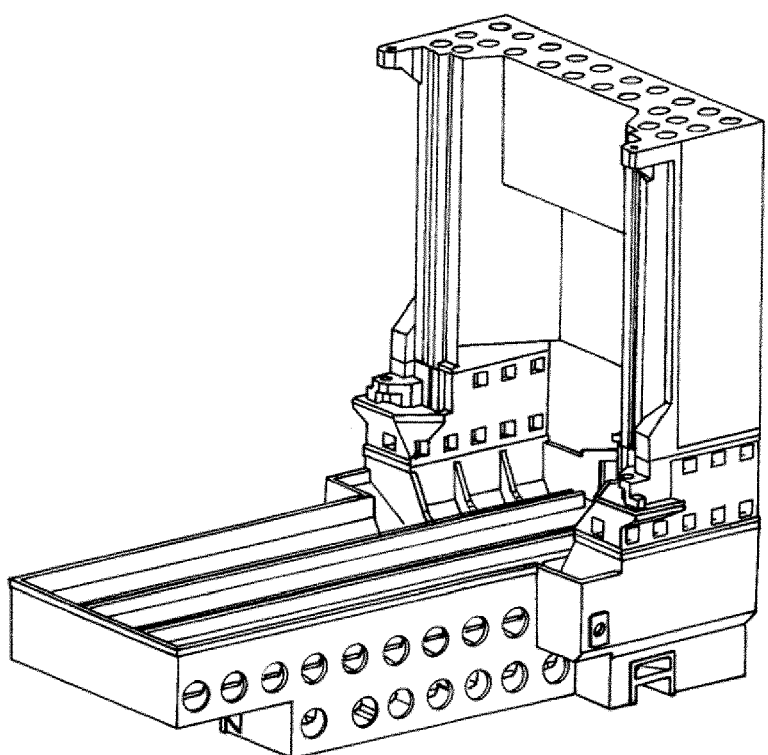
FIG. 5 shows a perspective view of two structural parts of the structural body of a machine tool.
Figure 5B:
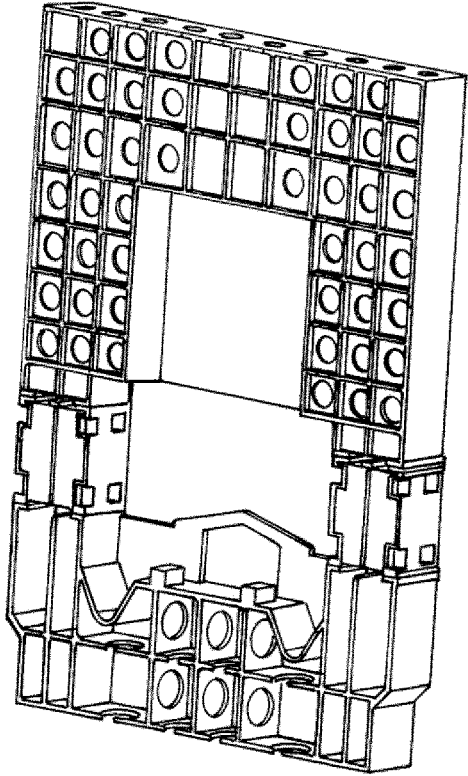

FIG. 5 illustrates two typical structural parts of the structural body of a machine tool to show that the parts are hollow inside and that the hollow spaces can be used to conform the cavity 31.

Figure 7:
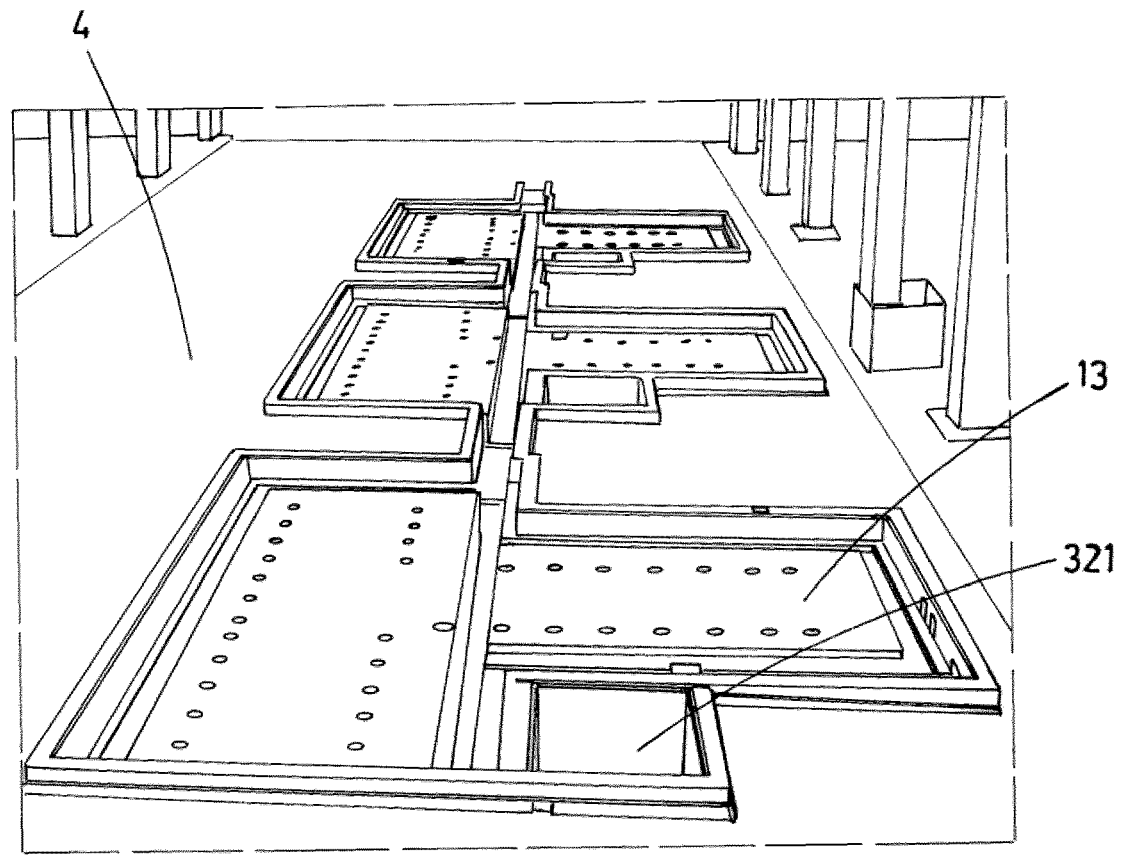
FIG. 7 shows a perspective view of the foundation of a machine tool according to an embodiment of the disclosure.

FIG. 7 illustrates a foundation 13 for the machine tool according to an embodiment of the disclosure. The foundation 13 includes ducts 321 which form part of the conduit 3.

Figure 8:
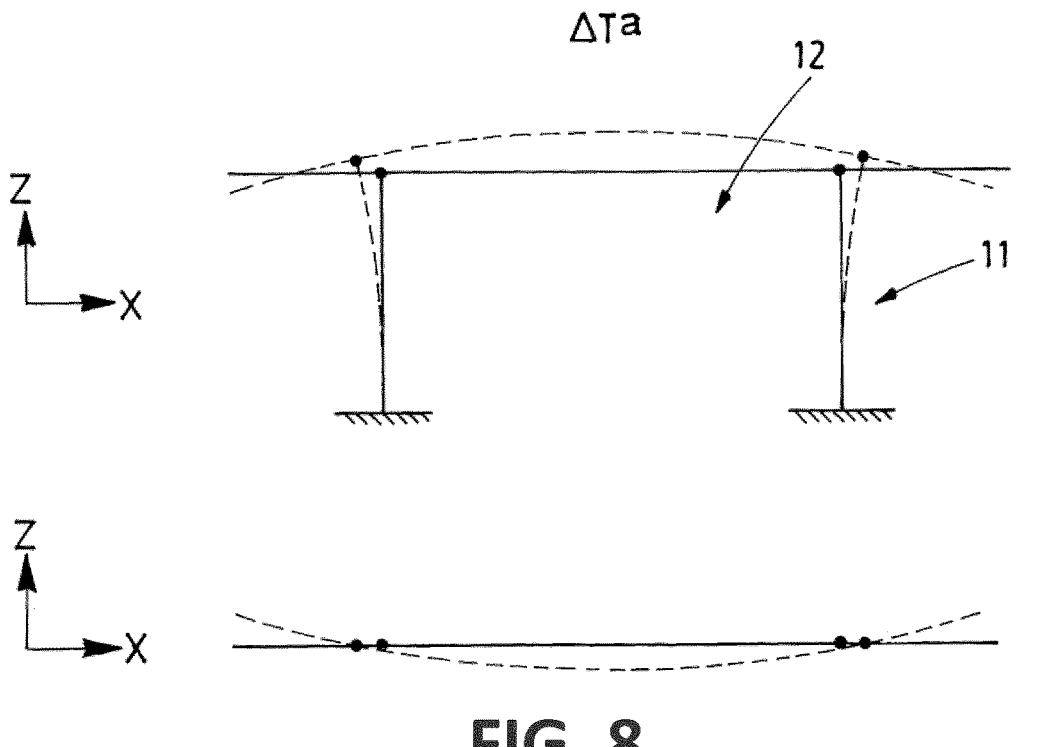
FIG. 8 shows a schematic illustration of a front and plan view of the vertical lathe of FIG. 2 at a high temperature causing deformation in the ZX and XY planes.

FIG. 8 shows a schematic illustration of a front and plan view of the vertical lathe of FIG. 2 at a high temperature causing deformation of the columns 11 and cross beam 12 in the ZX and XY planes.

Figure 9:
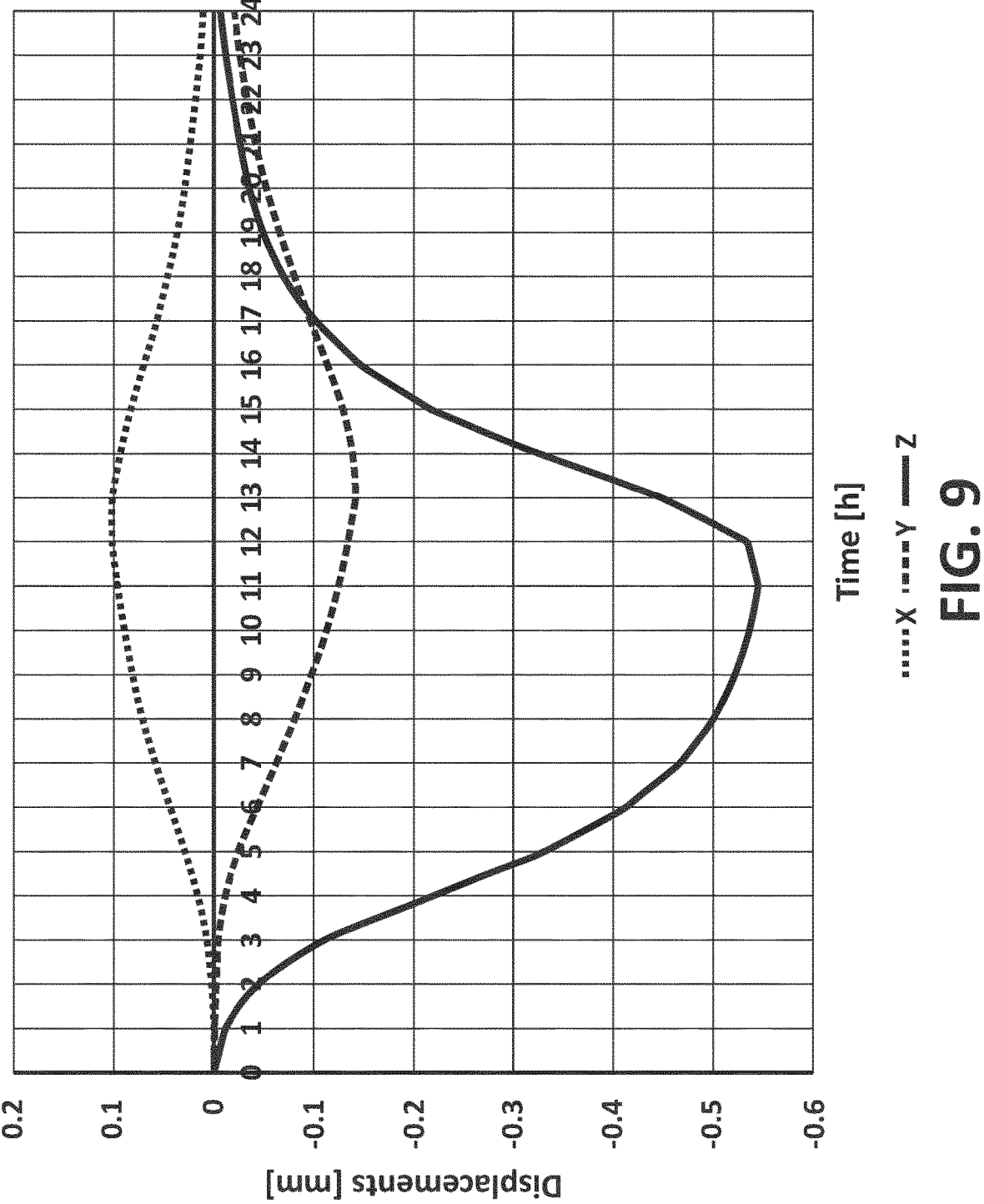
FIG. 9 shows the quantitative results of a simulation of the effect of temperature changes over time on the displacement of the centre of a tool on a milling head with respect to the axis of a turning table.

FIG. 9 shows the quantitative results of a simulation of the effect of temperature changes over time on the displacement of the centre of a tool on a milling head with respect to the axis of a turning table.

Figure 10:
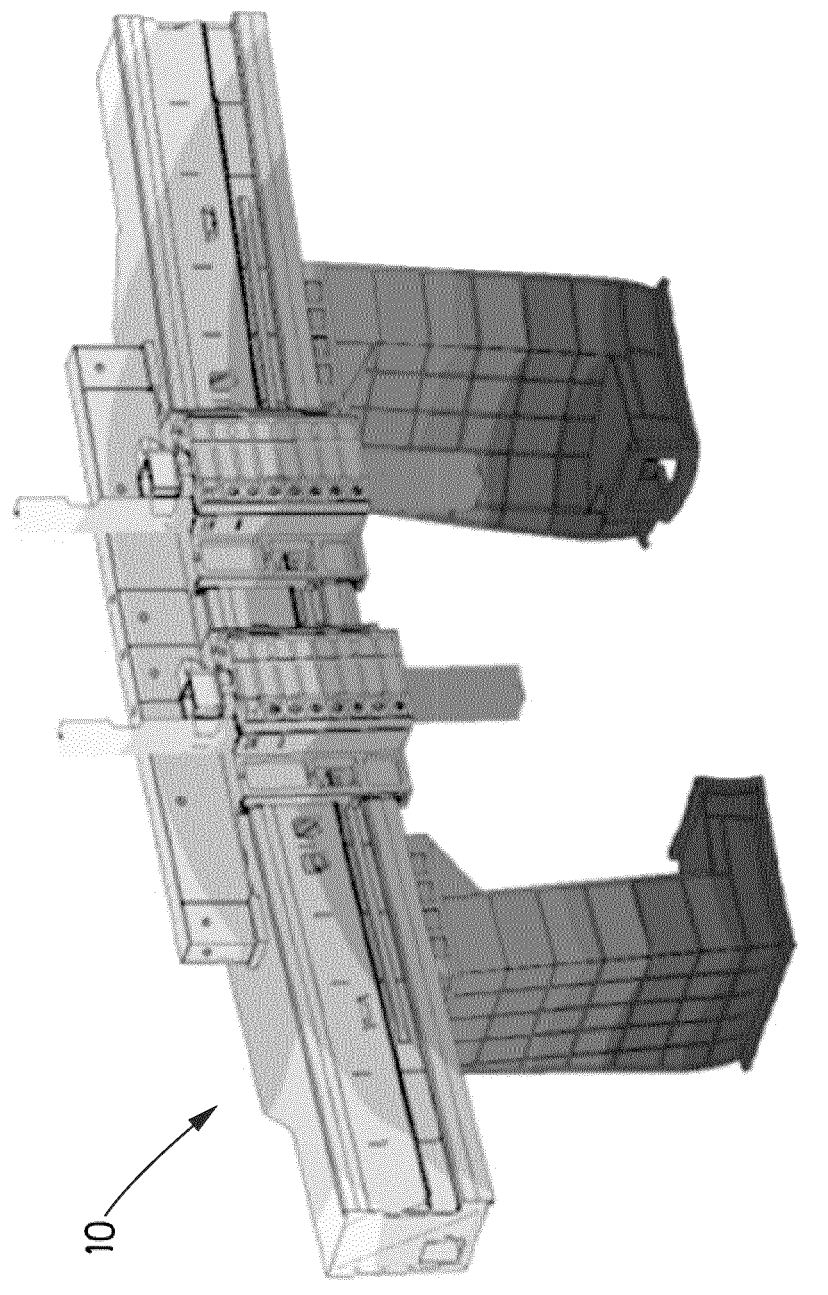
FIG. 10 shows the qualitative results of the simulation of FIG. 9 showing the distribution of deformation across the vertical lathe of FIG. 2.

FIG. 10 shows the qualitative results of the simulation of FIG. 9 showing the distribution of deformation across the vertical lathe of FIG. 2.

Figure 11A:
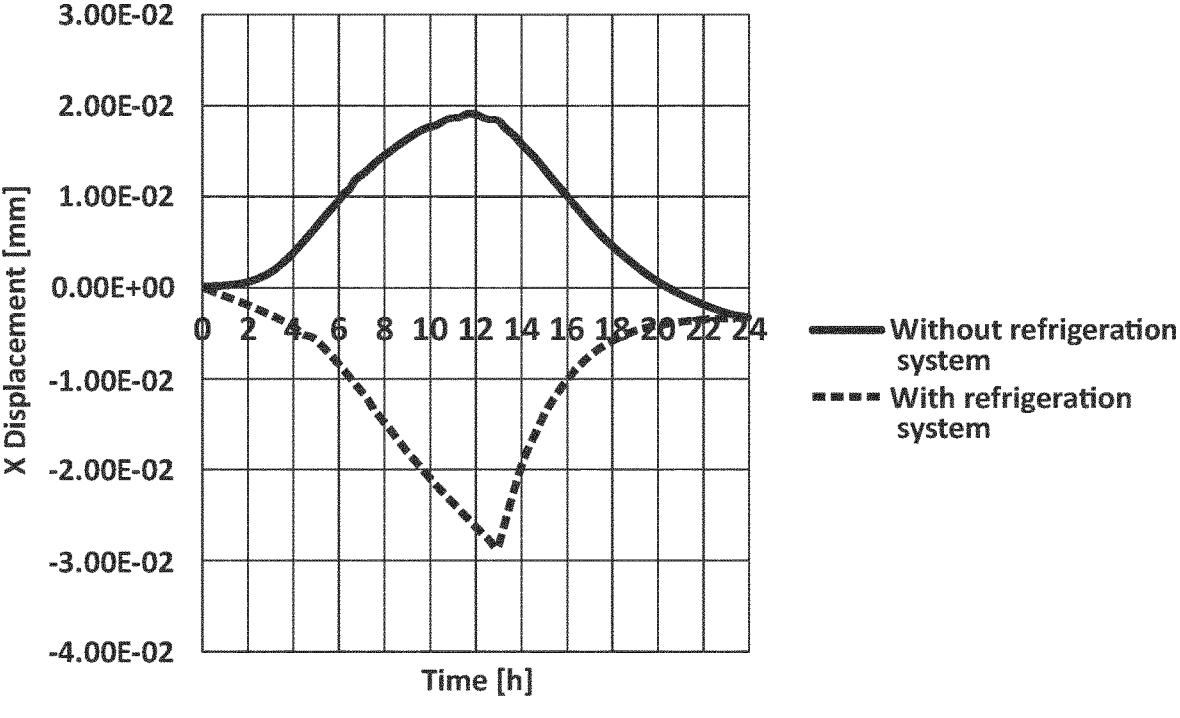
FIGS. 11A, 11B and 11C show the variation over time of the tool tip position of a vertical lathe with a refrigeration system according to the disclosure.
Figure 11B:
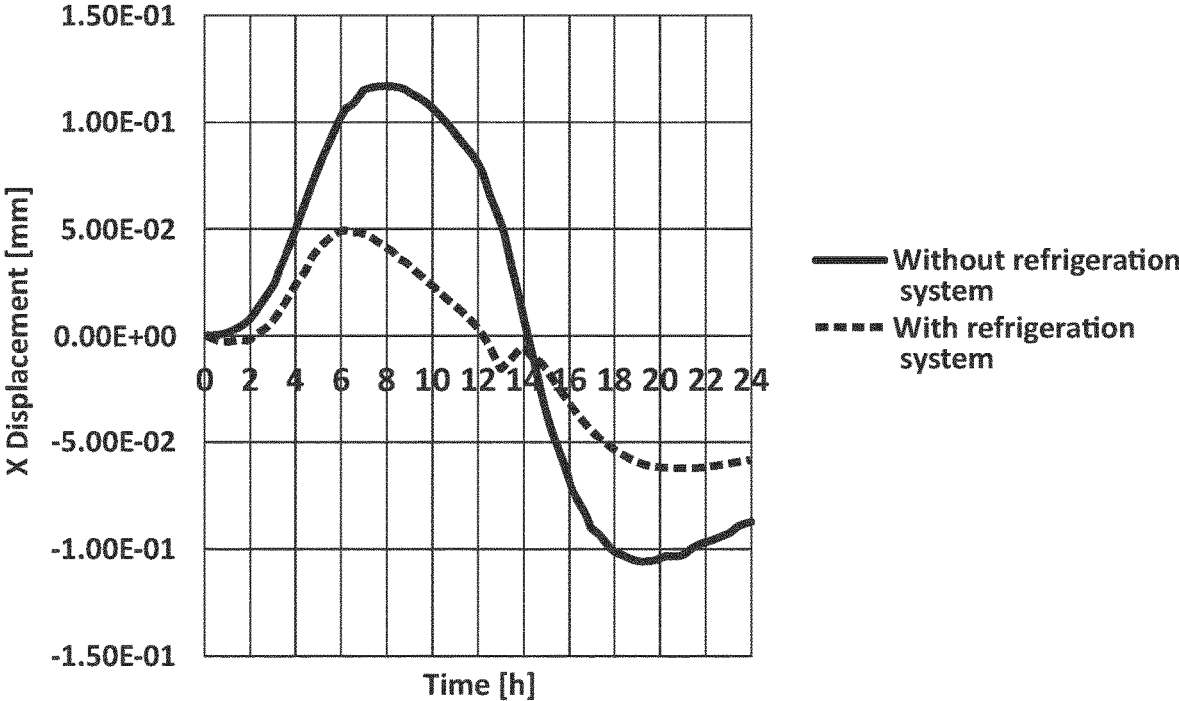
Figure 11C:
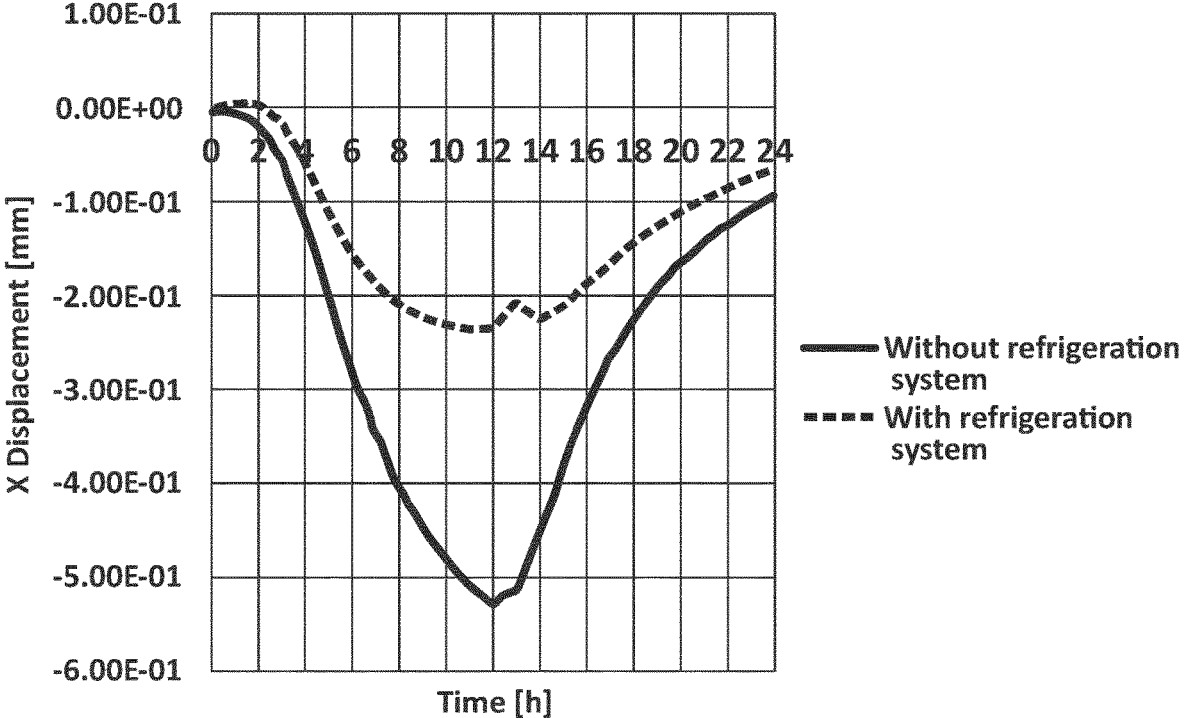

FIGS. 11A, 11B and 11C show the variation over time of the tool tip position in X, Y and Z axes in a vertical lathe as illustrated in FIG. 2. The doted lines illustrate the position of the tool in a vertical lathe with a refrigeration system according to the disclosure. The continuous lines illustrate the position of the tool in a vertical lathe without a refrigeration system. The conditions of this measures were the following:

Summer

Ambient temperature: 20÷30° C.

Soil temperature: 15° C.

Active ventilation: 0÷9000 m^3/h, depending on ambient temperature.

In this text, the term "comprises" and its derivations (such as "comprising", etc.) should not be understood in an excluding sense, that is, these terms should not be interpreted as excluding the possibility that what is described and defined may include further elements.

The disclosure is obviously not limited to the specific embodiments described herein, but also encompasses any variations that may be considered by any person skilled in the art within the general scope of the disclosure as defined in the claims.

The invention claimed is:

1. A machine tool with improved thermal stability comprising:

a workpiece support for supporting at least one workpiece for allowing machining of the workpiece; and a support structure comprising a tool carrier support, wherein the tool carrier support supports a tool carrier configured for carrying and driving a tool for machining a workpiece supported by the workpiece support through a relative movement between the workpiece and the tool, the machine being characterized by comprising a conduit configured to allow the flow of air in a closed circuit, the conduit comprising a surface part and an underground part, the surface part being an inner cavity of the support structure and the underground part comprising a piping configured to be buried in the soil beneath the support structure.

2. The machine tool according to claim 1, wherein the support structure comprises two vertical columns joined by a transversal crossbeam such that the tool carrier support is mounted on a carriage displaceable along the transversal crossbeam in an horizontal direction X, whilst the tool carrier is mounted in the tool carrier support and displaceable in a vertical direction Z and wherein the surface part of the conduit is formed by an inner cavity in the vertical columns and an inner cavity in the transversal crossbeam.

3. The machine tool according to claim 1, wherein the underground part comprises a serpentine tube.

4. The machine tool according to claim 1, wherein the underground part comprises a duct embedded in the foundation of the machine.

5. The machine tool according to claim 1, wherein the underground part is buried more than 1 m.

6. The machine tool according to claim 1, wherein the length of the underground part is more than 10 m.

7. The machine tool according to claim 1, wherein the air is recirculated through the circuit by a fan or a driving means.

8. The machine tool according to claim 1, further comprising driving means for recirculating the air in the closed circuit.

9. A method for improving thermal stability in a machine tool comprising a workpiece support for supporting at least one workpiece for allowing machining of the workpiece, a support structure comprising a tool carrier support, wherein the tool carrier support supports a tool carrier, the tool carrier being configured for carrying and driving a tool for machining a workpiece supported by the workpiece support through a relative movement between the workpiece and the tool, the method including the following steps:

providing an inner cavity in the support structure, burying a piping in the soil beneath the structure, forming a closed conduit with a surface part and an underground part wherein the surface part comprises the inner cavity of the support structure and the underground part comprises the piping buried in the soil beneath the structure, providing driving means for moving air in a closed circuit inside the conduit.

10. The method according to claim 9, wherein the support structure comprises two vertical columns joined by a transversal crossbeam such that the tool carrier support is mounted on a carriage displaceable along the transversal crossbeam in an horizontal direction X, whilst the tool carrier is mounted in the tool carrier support and displaceable in a vertical direction Z and wherein the closed conduit is formed with a surface part comprising an inner cavity in the vertical columns and an inner cavity in the transversal superior crossbeam and the underground part comprises the piping buried in the soil beneath the structure.

11. The method according to claim 9, wherein the machine tool a is a horizontal machining center, a vertical machining center, a milling machine, a grinding machine or a vertical lathe.

* * * * *